J. LOMASNEY.
ASSORTING APPARATUS.
APPLICATION FILED FEB. 17, 1916.

1,242,214.

Patented Oct. 9, 1917.
2 SHEETS—SHEET 1.

John Lomasney
INVENTOR.
BY
ATTORNEYS.

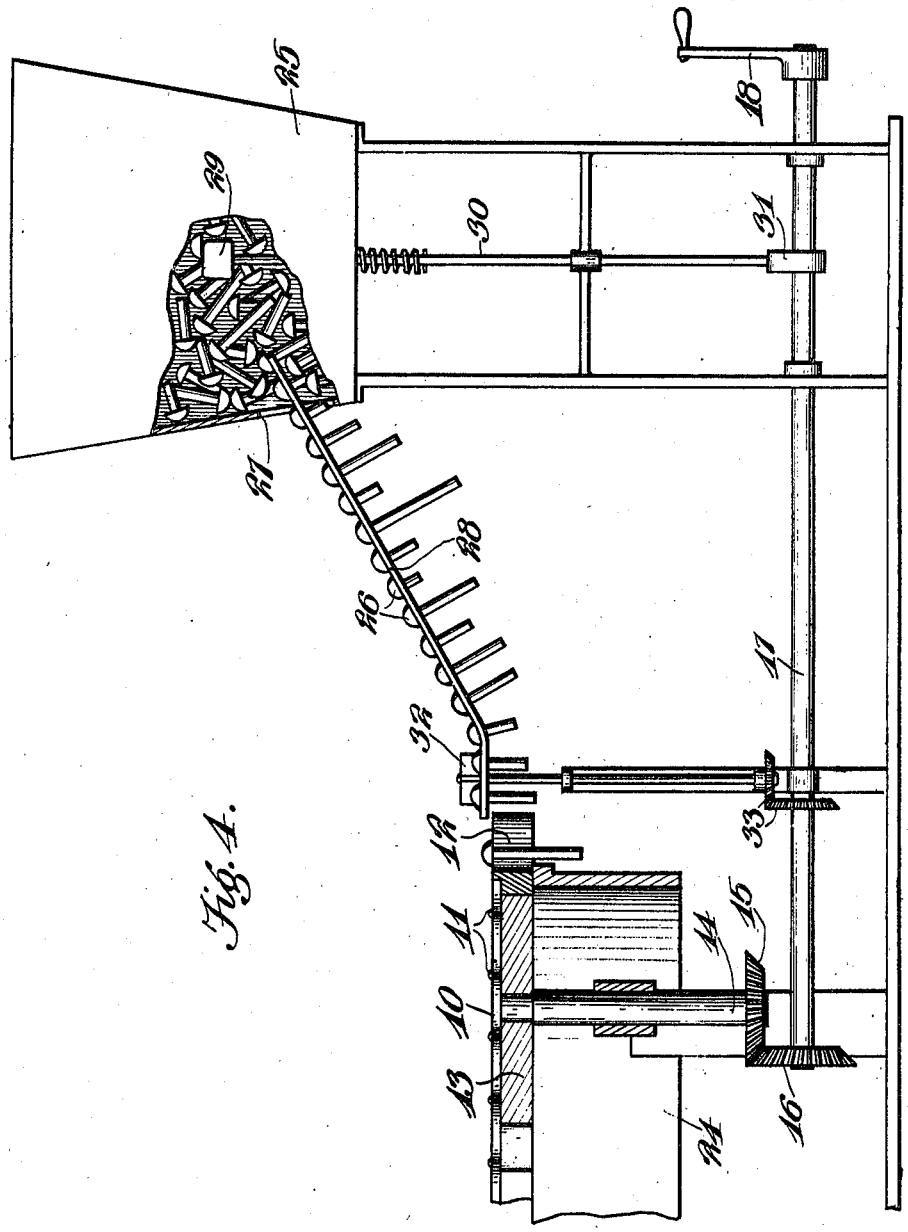

UNITED STATES PATENT OFFICE.

JOHN LOMASNEY, OF CHICAGO, ILLINOIS.

ASSORTING APPARATUS.

1,242,214.   Specification of Letters Patent.   Patented Oct. 9, 1917.

Application filed February 17, 1916. Serial No. 78,855.

*To all whom it may concern:*

Be it known that I, JOHN LOMASNEY, a citizen of the United States, residing at Chicago, in the county of Cook and State of Illinois, have invented new and useful Improvements in Assorting Apparatus, of which the following is a specification.

The apparatus which is the subject matter of the present application for patent has been designed for assorting rivets and similar articles according to their length, and its object is to provide a means whereby this is accomplished automatically in an expeditious manner, and with the greatest accuracy.

With the object stated in view, the invention consists in a novel combination and arrangement of parts to be hereinafter described and claimed, and in order that the same may be better understood, reference is had to the accompanying drawings forming a part of this specification.

In the drawings—

Fig. 4 is an enlarged sectional detail on the line 4—4 of Fig. 1 in connection with a feed device, said device being shown partly in section.

Figure 1:
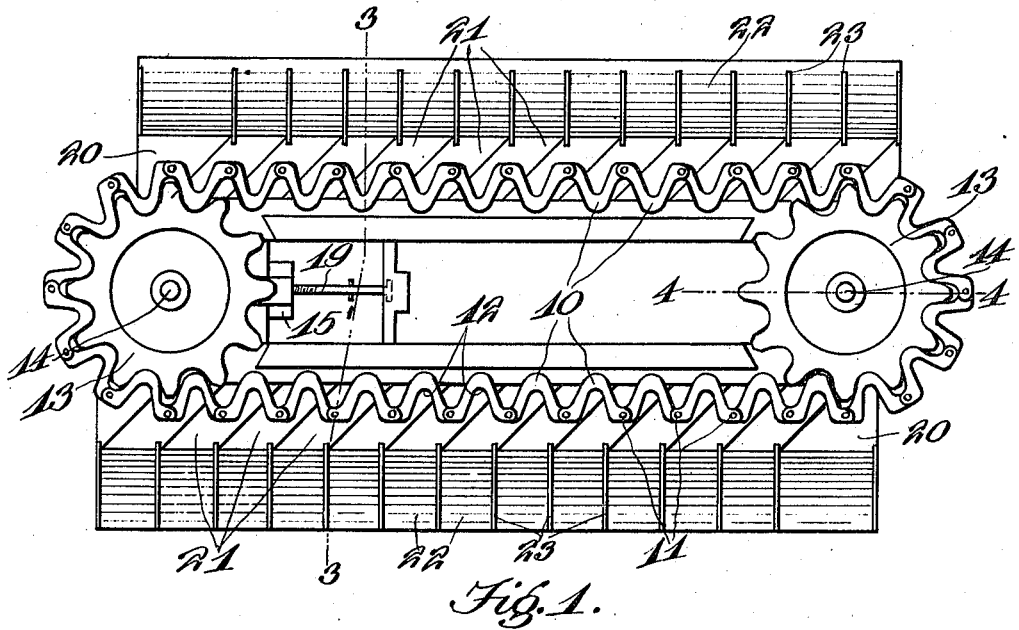
Figure 1 is a plan view of the apparatus.
Figure 2:
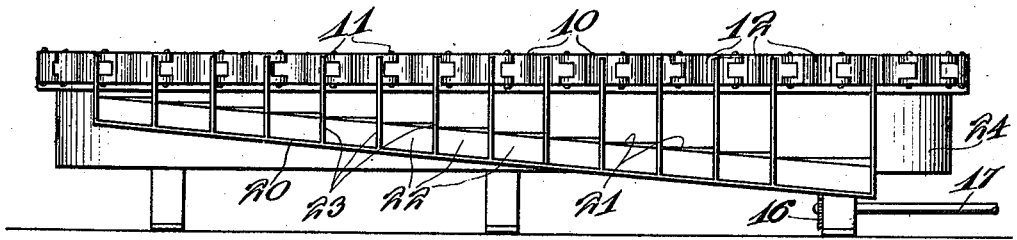
Fig. 2 is a side elevation thereof.
Figure 3:
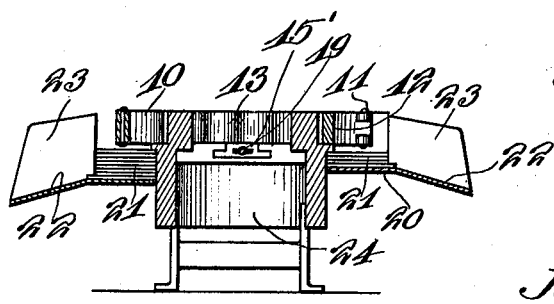
Fig. 3 is a cross-section on the line 3—3 of Fig. 1.

In carrying out the invention, there is provided a traveling, endless carrier having means for holding the rivets or other articles to be assorted loosely suspended, and arranged above a knock-off device which selects the rivets according to their varying lengths, and deflects the same to the proper collection devices. Although the device is primarily designed for assorting rivets, it will be understood, that it may be used for assorting other articles, and I do not wish to be limited to the particular use described.

The endless carrier is a horizontally positioned chain composed of substantially V-shaped links 10, the connection 11 between the same being at the extremities of the branches of the links, and they are arranged so that the bends connecting said branches point inward. This construction and arrangement of links provides an endless chain having recesses 12 on the outside in which the rivets are held.

The carrier chain is trained over sprocket wheels 13 mounted on vertical shafts 14, one of which latter has a bevel gear 15 in mesh with a bevel gear 16 on a shaft 17 operated by a crank handle 18; or power driven in any suitable manner. The other shaft 14 is adjustable to take up slack in the chain or for loosening the same, said shaft being mounted in a movable bearing 15' provided with an adjusting screw 19.
As such chain adjusting means are well known a further description thereof is deemed unnecessary.

Beneath the carrier chain, on each side thereof, is mounted the knock-off device, the same comprising a stepped shelf 20 which extends parallel to the chain. The steps 21 extend at an oblique angle to the chain, and they gradually increase in height in the direction the chain travels. A stepped shelf is mounted beneath each run of the chain, and the rise of the two shelves is in opposite directions to correspond to the opposite directions in which the two runs of the chain travel.

Each shelf 20 has its outer portion inclined downward, as indicated at 22 and divided into compartments by partitions 23 corresponding to the number of steps, a partition extending from the outer edge of each
step 21.

A suitable stand 24 supports the shelves 20 and the bearings of the shafts 14.

At the receiving end of the carrier chain is mounted a hopper 25 containing the rivets to be assorted. The hopper has an outlet 27 from which extends a feed chute 28 which leads to the carrier chain. This chute is an inclined plate having a slot to receive the rivets, the latter hanging in the slots and being supported by the heads. As the plate is inclined, the rivets slide down the slot by gravity.

An agitator 29 works in the hopper 25, the same being actuated by a rod 30 riding on a cam 31 on the shaft 17, said rod carrying the agitator.

At the bottom of the chute 28, and working across the slot thereof is a feed wheel 32 driven by a bevel gearing 33 from the shaft 17. The operation of this wheel is properly timed to regulate the advance of the rivets 26 according to the rate of speed the carrier chain travels.

In operation, the shaft 17 being set in motion, the carrier chain moves past the lower end of the chute 28, and as the recesses 12 pass the same, the feed wheel 32 pushes the rivets into the same, each recess receiving a rivet. The rivets are hung on the chain by their heads and they are thus loosely suspended from the chain in pendent position, and they are carried in this position along the shelf 20, above the same, until knocked off by one of the steps 21, the edge thereof forming a barrier which intercepts the rivets. As the steps increase in height in the direction the chain travels, the longest rivets are knocked off first, and the shortest ones last, each rivet remaining suspended from the chain until it is intercepted by the edge of a step having a height corresponding to the length of the rivet. The chain pushes the rivets along the oblique edges of the steps, and they drop into the proper compartment and roll down the same into a suitable receptacle (not shown) placed beneath the same. By arranging the edges of the steps obliquely to the chain, the travel of the rivets from the steps to the compartments is assured.

I claim:—

1. An apparatus for assorting articles according to length, comprising a traveling endless carrier having means for holding the articles loosely suspended in pendent position, and a stepped knock-off device mounted beneath the carrier, said device comprising a series of barriers of different heights arranged to intercept the articles, and said barriers extending at an oblique angle to the line of travel of the carrier.

2. An apparatus for assorting articles according to length, comprising an endless chain having recesses on its outer side adapted to hold the articles in loosely suspended and pendent position, and a stepped knock-off device mounted beneath the chain, the steps being of different heights and located to intercept the articles carried by the chain.

3. An apparatus for assorting articles according to length, comprising an endless chain having recesses on its outer side adapted to hold the articles in loosely suspended and pendent position, and a stepped knock-off device mounted beneath the chain, said device comprising a series of barriers of different heights arranged to intercept the articles.

4. An apparatus for assorting articles according to length, comprising an endless chain having recesses on its outer side adapted to hold the articles in loosely suspended and pendent position, and a stepped knock-off device mounted beneath the chain, said device comprising a series of barriers of different heights arranged to intercept the articles, and said barriers extending at an oblique angle to the line of travel of the carrier.

5. An apparatus for assorting articles according to length, comprising an endless chain having recesses on its outer side adapted to hold the articles in loosely suspended and pendent position, a stepped knock-off device mounted beneath the chain, said device comprising a series of barriers of different heights arranged to intercept the articles, and article-receiving compartments at the outer ends of the barriers.

6. An apparatus for assorting articles according to length, comprising an endless chain having its links substantially V-shaped, the connection between the links being at the extremities of the branches thereof, and said links being arranged so that the bends connecting said branches point inward, leaving recesses on the outside of the chain in which the articles are held in loosely suspended and pendent position, and a stepped knock-off device mounted beneath the chain, the steps being of different heights and located to intercept the articles carried by the chain.

7. An apparatus for assorting articles according to length, comprising a traveling endless carrier having means for holding the articles in loosely suspended and pendent position, and a stepped knock-off device mounted beneath the carrier, said device comprising a series of barriers of different heights arranged to intercept the articles, and said barriers extending at an oblique angle to the line of travel of the carrier and having downwardly inclined discharge portions.

In testimony whereof I affix my signature.

JOHN LOMASNEY.